(12) United States Patent
Brown et al.

(10) Patent No.: US 10,740,777 B2
(45) Date of Patent: Aug. 11, 2020

(54) EXTRINSIC INCENTIVIZED SCAFFOLDING IN COMPUTER GAMES VIA ADVERTISING RESPONSIVE TO INTRINSIC GAME EVENTS

(71) Applicant: Tapjoy, Inc., San Francisco, CA (US)

(72) Inventors: Hans-Frederick Brown, San Rafael, CA (US); Shane Mihelic-Booth, San Francisco, CA (US)

(73) Assignee: TAPJOY, INC., San Francisco, CA (US)

( * ) Notice: Subject to any disclaimer, the term of this patent is extended or adjusted under 35 U.S.C. 154(b) by 891 days.

(21) Appl. No.: 13/802,027

(22) Filed: Mar. 13, 2013

(65) Prior Publication Data
US 2014/0278853 A1 Sep. 18, 2014

(51) Int. Cl.
*G06Q 30/02* (2012.01)
(52) U.S. Cl.
CPC ................................ *G06Q 30/0209* (2013.01)
(58) Field of Classification Search
CPC .................................................. G06Q 30/0209
USPC ........................................................ 705/14.12
See application file for complete search history.

(56) References Cited

U.S. PATENT DOCUMENTS

| 7,647,252 | B2 | 1/2010 | Rampell et al. |
| 7,698,171 | B2 | 4/2010 | Rampell et al. |
| 7,788,139 | B2 | 8/2010 | Rampell et al. |
| 7,848,960 | B2 | 12/2010 | Rampell et al. |
| 8,409,000 | B1* | 4/2013 | Colaco ............... A63F 13/12 463/31 |
| 9,256,888 | B2* | 2/2016 | Chow ................ H04L 67/38 |
| 9,264,769 | B2* | 2/2016 | Baker ............ H04N 21/44204 |
| 9,314,697 | B2* | 4/2016 | Levi .................. A63F 13/216 |
| 2002/0095333 | A1 | 7/2002 | Jokinen et al. |
| 2002/0098891 | A1* | 7/2002 | Graham ............... A63F 13/12 463/42 |
| 2002/0120589 | A1* | 8/2002 | Aoki ..................... A63F 13/10 705/400 |
| 2002/0128057 | A1 | 9/2002 | Walker et al. |

(Continued)

FOREIGN PATENT DOCUMENTS

WO  WO2013/033266 A1  3/2013

OTHER PUBLICATIONS http://gamerlimit.com/2009/07/the-history-of-in-game-advertising/.*

(Continued)

*Primary Examiner* — Breffni Baggot
(74) *Attorney, Agent, or Firm* — Hickman Palermo Becker Bingham LLP

(57) ABSTRACT

In an embodiment, a data processing method comprises receiving, by a mobile app, incentive data comprising one or more app event types, wherein each app event type is associated with an incentive frequency value and a reward type; detecting an occurrence of an app event of the mobile app, wherein the app event is associated with a particular app event type of the one or more app event types; determining, based on the incentive frequency value for the particular app event type, whether to generate a scaffolding event comprising displaying an advertisement and providing a reward of the reward type associated with the particular app event type; displaying the advertisement and providing the reward; wherein the method is performed by one or more computing devices.

28 Claims, 7 Drawing Sheets

(56) References Cited

U.S. PATENT DOCUMENTS

| | | | |
|---|---|---|---|
| 2005/0261062 A1* | 11/2005 | Lewin | A63F 13/12 463/42 |
| 2008/0077506 A1 | 3/2008 | Rampell et al. | |
| 2008/0091528 A1 | 4/2008 | Rampell et al. | |
| 2008/0162371 A1 | 7/2008 | Rampell et al. | |
| 2008/0261191 A1* | 10/2008 | Woolf | G06Q 50/20 434/323 |
| 2009/0292599 A1 | 11/2009 | Rampell et al. | |
| 2010/0228613 A1* | 9/2010 | Anderson | G06Q 30/02 705/14.13 |
| 2011/0131089 A1 | 6/2011 | Walker et al. | |
| 2011/0258026 A1* | 10/2011 | Prince | G06Q 30/02 705/14.16 |
| 2012/0047017 A1* | 2/2012 | Hernandez | G06Q 30/0241 705/14.55 |
| 2012/0072283 A1* | 3/2012 | DeVore | G06Q 30/0251 705/14.49 |
| 2012/0158515 A1* | 6/2012 | K | G06Q 30/0269 705/14.66 |
| 2012/0197716 A1 | 8/2012 | Rampell et al. | |
| 2012/0197717 A1 | 8/2012 | Rampell et al. | |
| 2012/0197730 A1 | 8/2012 | Rampell et al. | |
| 2012/0197731 A1 | 8/2012 | Rampell et al. | |
| 2012/0209668 A1 | 8/2012 | Angelos et al. | |
| 2012/0209908 A1 | 8/2012 | Angelos et al. | |
| 2012/0311504 A1* | 12/2012 | van Os | G06F 3/0482 715/853 |
| 2013/0231999 A1* | 9/2013 | Emrich | G06Q 30/0271 705/14.43 |
| 2013/0237318 A1* | 9/2013 | Colaco | A63F 13/12 463/31 |
| 2014/0024451 A1* | 1/2014 | Colaco | A63F 13/12 463/31 |
| 2014/0073420 A1* | 3/2014 | Matthew | G06Q 30/02 463/29 |
| 2014/0188897 A1* | 7/2014 | Baker | G06Q 30/0631 707/748 |
| 2014/0278853 A1* | 9/2014 | Brown | G06Q 30/0209 705/14.12 |
| 2014/0358260 A1* | 12/2014 | Burgin | G07F 17/3239 700/91 |

OTHER PUBLICATIONS

History of IGA (NPL: http://gamerlimit.com/2009/07/the-history-of-in-game-advertising/).* http://gamerlimit.com/2009/07/the-history-of-in-game-advertising/ (Year: 2009).*

University of Chicago, Richard Thaler, "Analomies: The Winner's Curse", Journal of Economic Perspectives, vol. 2, No. 1, February (Year: 1988).*

University of Chicago Press, "Science in the Age of Computer Simulation", Eric Winsberg (Year: 2010).*

International Searching Authority, "Search Report" in application No. PCT/US 14/25454, dated Dec. 16, 2014, 8 pages.

Claims in application No. PCT/US 14/25454 dated Dec. 2014, 8 pages.

* cited by examiner

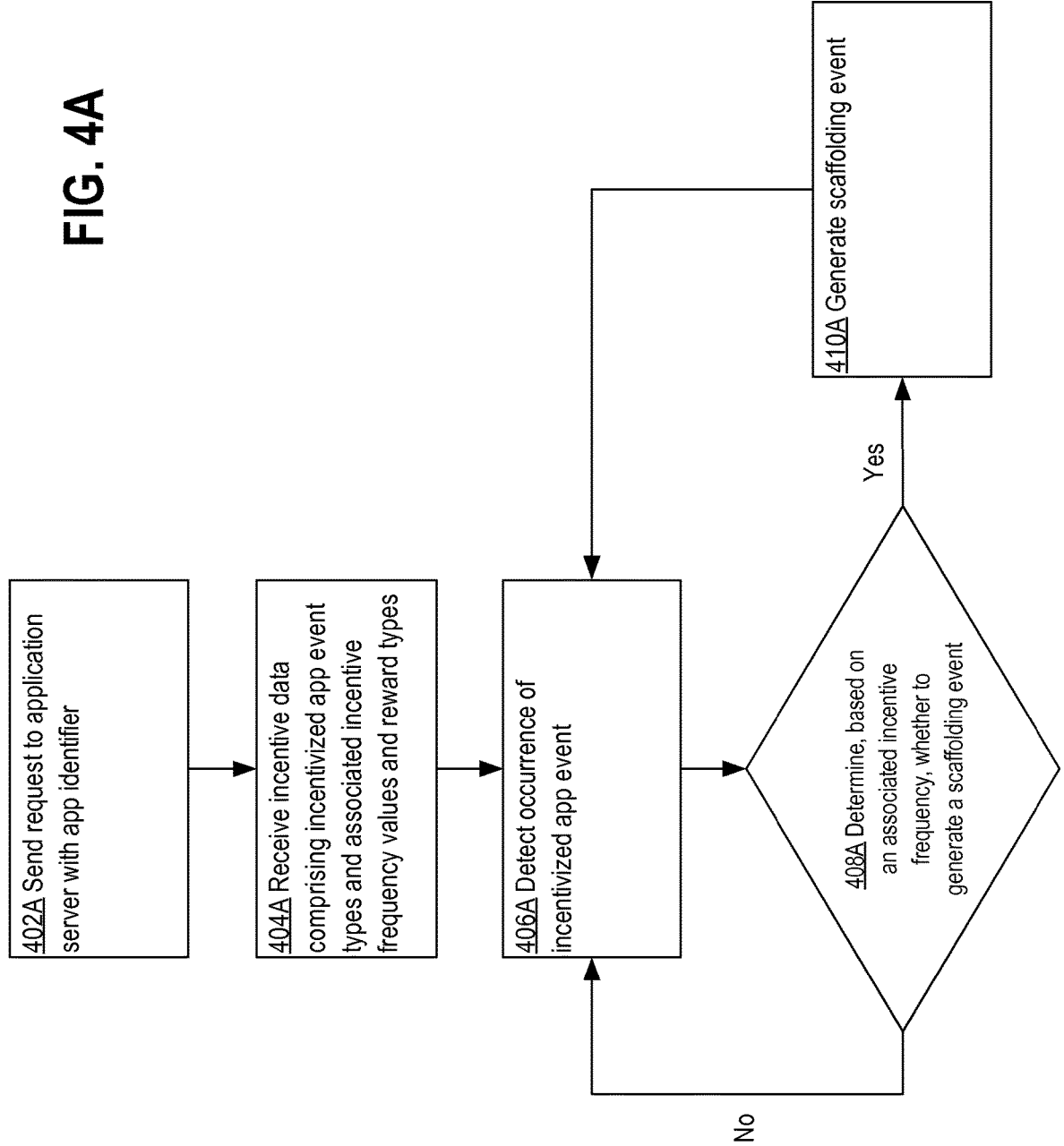

EXTRINSIC INCENTIVIZED SCAFFOLDING IN COMPUTER GAMES VIA ADVERTISING RESPONSIVE TO INTRINSIC GAME EVENTS

FIELD OF THE INVENTION

The present disclosure generally relates to the field of delivering online advertisements to computing devices such as mobile computing devices. More particularly, the present disclosure relates to delivering online advertisements in response to mobile application events and techniques for providing rewards in computer games.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Developers and publishers of computer program applications ("apps") often may use advertising in apps as one way to generate revenue, including in the case of apps designed to run on mobile devices. For example, a mobile app developer may program an app such that advertisements ("ads") occasionally are displayed in one or more graphical user interfaces of the app when the app is installed and executed by a mobile device user. The ads may present a user with product and service offers and other information that may be of interest to the user and, in exchange for the display of the ads in an app, the mobile app developer or other entity responsible for the app may receive compensation from advertisers according to known advertising compensation models.

One approach used for displaying ads in an app is for an app developer to programmatically identify one or more particular events that may occur during execution of the app to serve as a trigger point or condition for the display of an ad. For example, a developer may program an app such that ads are displayed in response to a user launching the app, opening an in-app menu, or browsing an in-app store. However, this approach is restrictive in that app developers and publishers may be unable to finely-tune the display of ads in an app to match a user's interaction with the app. For example, a developer or publisher of a game-related app may desire that an ad be displayed in response to some, but not all, occurrences of a particular in-game event (e.g., in response to some portion of occurrences of a user failing to complete a level in the game). Further, an app developer or publisher may desire over time to modify the relationship and frequency of ad displays with respect to particular app events, but doing so may be difficult using current approaches due to logistical problems of re-programming and re-deploying an app to a large number of users.

SUMMARY

The appended claims may serve as a summary of the invention.

BRIEF DESCRIPTION OF THE DRAWINGS

In the drawings:

FIG. 4A illustrates a computer-implemented process for detecting incentivized app events and determining whether to generate a scaffolding event.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview

In an embodiment, a data processing method comprises receiving, by a mobile app, incentive data comprising one or more app event types, wherein each app event type is associated with an incentive frequency value and a reward type; detecting an occurrence of an app event of the mobile app, wherein the app event is associated with a particular app event type of the one or more app event types; determining, based on the incentive frequency value for the particular app event type, whether to generate a scaffolding event comprising displaying an advertisement and providing a reward of the reward type associated with the particular app event type; displaying the advertisement and providing the reward; wherein the method is performed by one or more computing devices.

In an embodiment, a data processing method comprises receiving, by a game app, incentive data comprising one or more adverse gameplay event types, wherein each adverse gameplay event type is associated with an incentive frequency value and a game reward type; detecting an occurrence of a gameplay event of the game app, wherein the gameplay event is associated with a particular adverse gameplay event type of the one or more adverse gameplay event types; determining, based on the incentive frequency value associated with the adverse gameplay event type, whether to generate a scaffolding event including displaying an advertisement and providing a game reward of the game reward type associated with the particular adverse gameplay event type; displaying the advertisement and providing the game reward; wherein the method is performed by one or more computing devices.

2.0 Structural & Functional Overview

2.1 System Overview

Figure 1:
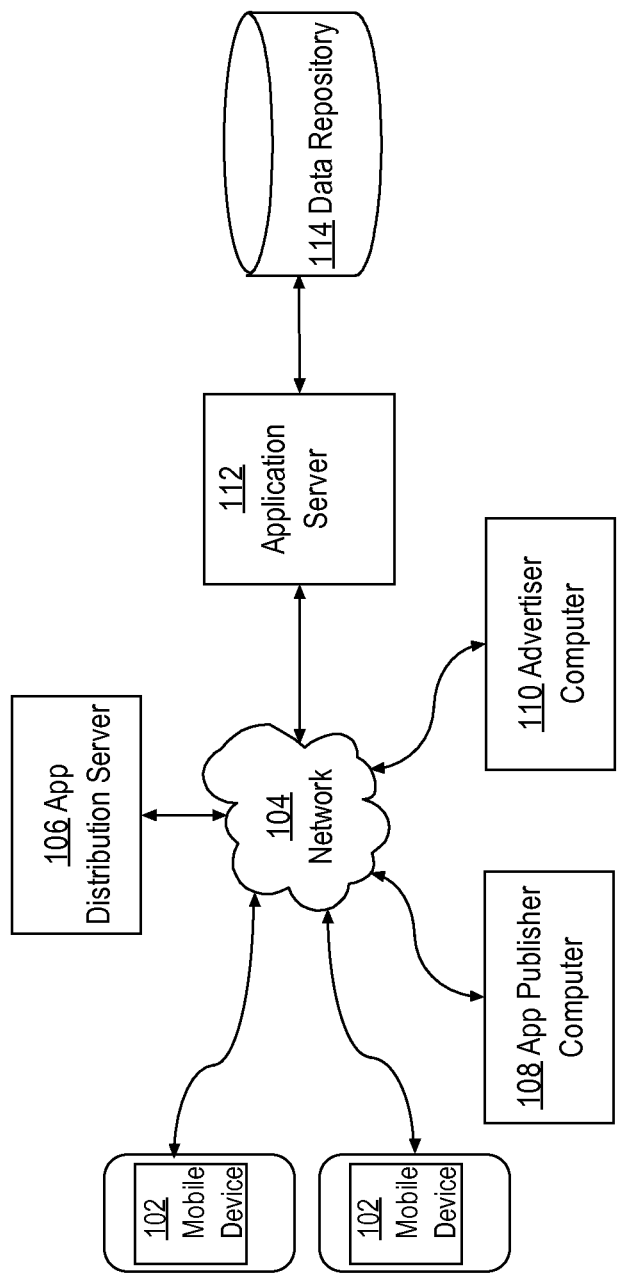
FIG. 1 illustrates a networked computer system arrangement that may be used to implement an embodiment.

FIG. 1 illustrates a networked computer system arrangement that may be used to implement an embodiment. In an embodiment, the computer system generally comprises one or more mobile computing devices 102, a network 104, at least one application server 112 coupled to a data repository 114, one or more app distribution servers 106, one or more app publisher computers 108, and one or more advertiser computers 110.

Each of the mobile computing devices 102 comprises a smartphone, tablet computer, netbook computer, laptop computer, or other movable computer. Examples include APPLE IPHONE and IPAD devices, ANDROID devices, etc. Typically wireless links couple the mobile devices 102 to network 104, which broadly represents one or more local area networks, wide area networks, internetworks, global interconnected internetworks such as the public internet, or a combination thereof. For purposes of illustrating a clear example, two (2) mobile devices 102 are shown in FIG. 1 and one cloud symbol representing network 104 is shown, but practical implementations may use thousands or millions of mobile devices and any number of interconnected networks.

App distribution server 106 is associated with a developer, author, or publisher of a mobile device application computer program or app, or a distribution channel such as a centralized app downloading service; examples include the APPLE APP STORE and GOOGLE PLAY service. The app may be a game app, utility app, product-related app, or other app. Typically the app developer, author, or publisher desires to provide advertising within the graphical user interface displays of the app. The application server 112 may serve ads to apps installed on mobile devices 102 directly or another ad inventory server (not shown) may serve the ads.

In one particular embodiment, application server 112 is associated with an advertising network service that directs advertisements to apps that comply with an application programming interface (API) or software development kit (SDK) defined by the advertising network service operator. In a commercial embodiment, the advertising network service is operated by Tapjoy, Inc., San Francisco, Calif. Advertisers associated with a computer such as advertiser computer 110 may place advertisements with the advertising network service. Publishers, such as software developers, game developers, or vendors of products or services, cause authoring and publication of apps that may provide non-advertising functions, such as games. The apps implement the API or SDK defined by the advertising network service operator. The service provider routes advertisements from advertiser computer 110, from a data repository 114, or from other sources, to the apps via the API or SDK. The service provider has contractual relationships with the advertisers and the publishers according to known advertising network models. Users of mobile devices 102 benefit from use of the apps and exposure to products or services that may interest them.

In one embodiment, application server 112 may host a web-based console or other interface that enables app publishers and advertisers to configure various aspects of the advertising network service. App publishers may use the web-based console, for example, to register developed apps with application server 112 and to configure settings related to the display of ads in registered apps. Advertisers may use the web-based console to provide ads for use in the advertising network service and to configure various aspects of the advertising network service with respect to how the advertiser's ads are used in one or more apps. Further details regarding configuration of the advertising network service by publishers and advertisers are provided in separate sections herein.

Application server 112 may be coupled to a data repository 118 that is configured to store data obtained from the mobile devices 102, from an app publisher computer 108, from an advertiser computer 110, and other data generated by application server 112.

2.2 SDK Integration

Figure 2:
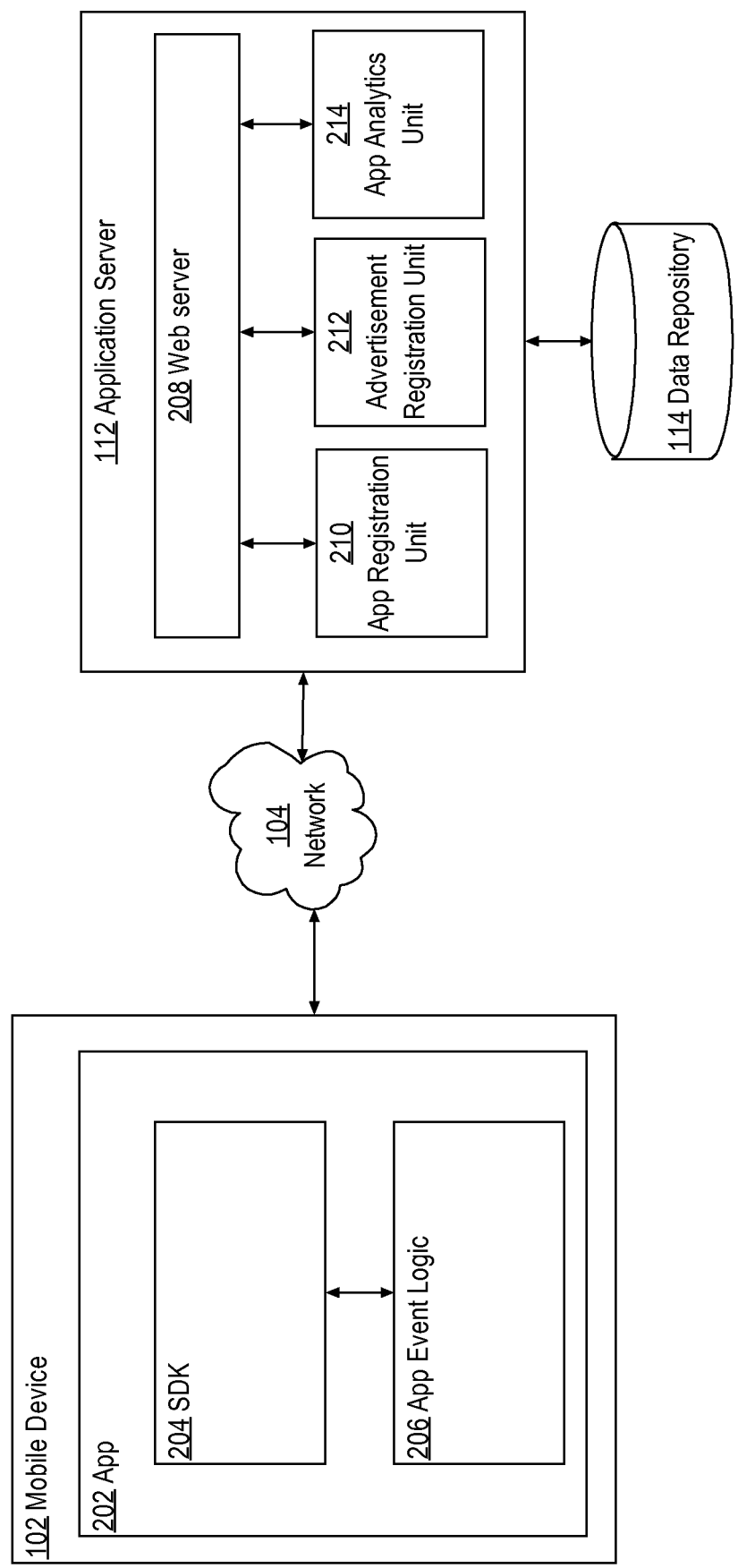
FIG. 2 illustrates further details of an embodiment of the system of FIG. 1.

FIG. 2 illustrates further details of an embodiment of the system of FIG. 1. In an embodiment, one of the mobile devices 102 hosts, executes or otherwise comprises an app 202. The app 202 also comprises SDK code 204 and app event logic 206, each of which is configured to perform special processing, further described herein, in response to detecting the occurrence of particular app events during execution of app 202. In one embodiment, app 202 may be an app configured to enable a user of a mobile device 102 to play a game, such as an action or arcade type game; however, the features described herein are not limited to game-related apps and may be applied to other types of app. For purposes of illustrating a clear example, FIG. 2 shows one app 202, but other embodiments may include any number of apps based upon the amount of memory or other storage that is available in a mobile device 102.

SDK code 204 typically is statically linked or dynamically linked to the rest of the code of app 202 at the time that a developer prepares production versions of an executable of the app 202. Consequently, at runtime, SDK code 204 runs as native code in a mobile device 102. However, the source code for SDK code 204 typically is defined by the owner or operator of the application server 112 and is not always known to the app developer, author or publisher, except possibly with respect to public interfaces or APIs that the owner or operator of the application server elects to publish or disclose.

In one embodiment, SDK code 204 comprises one or more public interfaces or APIs configured to enable a developer of app 202 to map one or more app events of app 202 to logic included in SDK code 204. In this context, an app event may include any processing event, step, or programmatic action that may occur during execution of app 202. For example, if app 202 is a game app, an app event may represent a processing event that occurs during execution of app 202 such as a user opening an in-game menu, the user beginning a particular level of the game, or the user ending a current game session. In an embodiment, a developer of app 202 may identify in app event logic 206 one or more particular app events of app 202 and cause app event logic 206 to interact with logic of SDK code 204 in response to an occurrence of the particular app events. For example, a developer may include a code segment or other logic in association with each of the particular app events that causes app 202 to trigger logic of SDK code 204 when a particular app event occurs during execution of app 202.

In one particular embodiment, app events identified by a developer in app event logic 206 and mapped to logic of SDK code 204 may generally comprise "adverse" app events. An adverse app event, in this context, may generally refer to an event that represents an obstacle or setback with respect to a user's interaction with app 202. Referring again to a game app example, adverse app events may comprise app events such as a user's in-game character losing energy or currency (e.g., as a result of the user committing a misstep in the game), the user failing to complete a level or stage in a threshold time period, or the user's current game attempt terminating as a result of the user's in-game character losing all available energy or currency.

In one embodiment, in response to notification of an occurrence of an app event by app event logic 206, logic of SDK code 204 may cause an occurrence of an event referred to herein as a scaffolding event. In this context, a scaffolding event refers to a programmatic event during execution of an app 202 wherein a user of app 202 may be provided with a reward in exchange for viewing a displayed ad or interacting with a displayed ad in a specified manner. In an embodiment, SDK code 204 may provide a reward by modifying some aspect of a user's interaction with app 202. For example, if app 202 is a game app, providing a reward to a user of app 202 may comprise increasing the user's number of available in-game lives, enabling the user to bypass a particular in-game stage, or adding to the user's amount of available in-game currency.

In this sense, the event may be referred to as a "scaffolding" event because it may serve to assist or enhance the user's interaction with app 202 by conceptually moving the user to a higher position, level or status within the game. By providing scaffolding events at various points during a user's interaction with an app, an app developer or publisher may increase a user's engagement and enjoyment of the game by assisting the user to advance in the app, while also providing value to the game publisher and advertisers through the display of ads. For example, scaffolding events may be used particularly in response to adverse app events, as described above, as a way to motivate the user to continue the user's interaction with the app. In an embodiment, an advertising network service enables app developers and publishers to further customize the generation of scaffolding events in response to app events, as further described herein.

In one embodiment, SDK code 204 may define one or more taxonomies of app event types to which an app developer may map particular app events of app 202. An app event taxonomy generally may provide a high-level classification of app event types for a particular type of app. For example, a game publisher may desire to identify and associate scaffolding events with adverse game events and accordingly, in one particular embodiment, a taxonomy of app event types may relate primarily to types of adverse gameplay events that may occur in the context of a game app. The following list provides an example taxonomy of app event types that may be defined by SDK code 204 for a game app:

Energy/currency punishment event—relating to an app event that causes the loss of in-game energy or currency.

Life punishment event—relating to an app event that causes the loss of an in-game life.

Game termination punishment event—relating to an app event that causes a game to terminate (e.g., because the user ran out of energy, currency, or time).

Setback punishment event—relating to an app event that causes the user to replay a level or stage of a game, or that causes the user to fail to advance from a particular level or stage, or that causes the user to lose certain abilities or other game advancing items.

Voluntary punishment event—relating to an app event causing the game to terminate in response to the user voluntary quitting the game.

The app event type taxonomy described above is provided only as an example; other taxonomies may include any number and types of gaming-related app events. Further, app event taxonomies may be defined for other types of apps and include app event types wholly unrelated to gameplay.

In one embodiment, SDK code 204 may further include logic enabling a developer of an app 202 to specify any number of custom app event types. For example, an app developer may identify one or more app events of app 202 that the developer may desire to associate with scaffolding events, but that are not a good fit for a pre-defined taxonomy of SDK code 204. In an embodiment, a developer of app 202 may define a custom app event type using app event logic 206 by providing a label for the custom app event type and mapping one or more app events to the custom app event type. The label provided for the custom app event type may be used for display and configuration of the custom app event types with the advertising network service, as further described herein with reference to FIG. 3.

In an embodiment, SDK code 204 may be further comprise logic configured to enable a developer of app 202 to map one or more app events of app 202 to particular reward types. A reward type may represent a type of a reward that may be presented to a user of app 202 and that may be associated with a scaffolding event generated by SDK code 204. For example, if app 202 is a game app that involves the use of in-game currency, one relevant reward type for the app may relate to increasing a user's amount of available in-game currency. In the example, a developer of app 202 may map an app event that causes a user's available in-game currency to increase to a reward type related to increasing in-game currency. In an embodiment, SDK code 204 may define one or more taxonomies of reward types to which an app developer may map particular app events of an app 202. The following list provides an example of one particular reward type taxonomy of game rewards that may be defined by SDK code 204 for a game app:

Currency or energy reward—relating to an app event causing an increase in the amount or value of a user's in-game currency or energy.

Life reward—relating to an app event causing an increase to a user's number of available in-game lives.

Game reward—relating to an app event causing an increase to a user's number of available game attempts.

Level forward reward—relating to an app event causing the user to advance one or more particular levels or stages of a game.

Item granting reward—relating to an app event causing the user to have access to one or more previously unavailable in-game items.

In an embodiment, similar to the description app event type taxonomies, SDK code 204 may further include logic enabling a developer of an app 202 to specify any number of custom reward types. For example, in the context of app 202, particular rewards desired by a developer (e.g., causing a user to have access to in-game items or abilities that are specific to app 202) may not be a good fit for a reward type taxonomy defined by SDK code 204. In an embodiment, a developer of app 202 may define a custom reward type using app event logic 206 by providing a label for the custom reward type and mapping one or more app events representing the custom rewards to the defined custom reward type.

2.2 App Registration

In the embodiment of FIG. 2, application server 112 comprises app registration unit 210 that enables an app developer, publisher, or other user to register an app that has integrated an instance of SDK code 204 with the advertising network service hosted by application server 112. In general, by registering an app with the advertising network service, an app publisher enables the registered app to receive ads from the advertising network service in connection with scaffolding events generated during a user's use of the app.

App publishers may further configure various aspects of the advertising network service with respect to a registered app, as described below.

In an embodiment, users may interact with app registration unit 210 and other components of application server 112 including advertisement registration unit 212 and app analytics unit 214, via a web-based console provided by web server 208. The web-based console may comprise one or more graphical dashboards and other graphical user interface displays that facilitate app publishers and advertisers configuration of the advertising network service. App publisher computer 108 and advertiser computer 110 may, for example, comprise browsers that enable app publishers and advertisers to access and interact with HTML documents generated by web server 208 to enable remote configuration.

Figure 3:
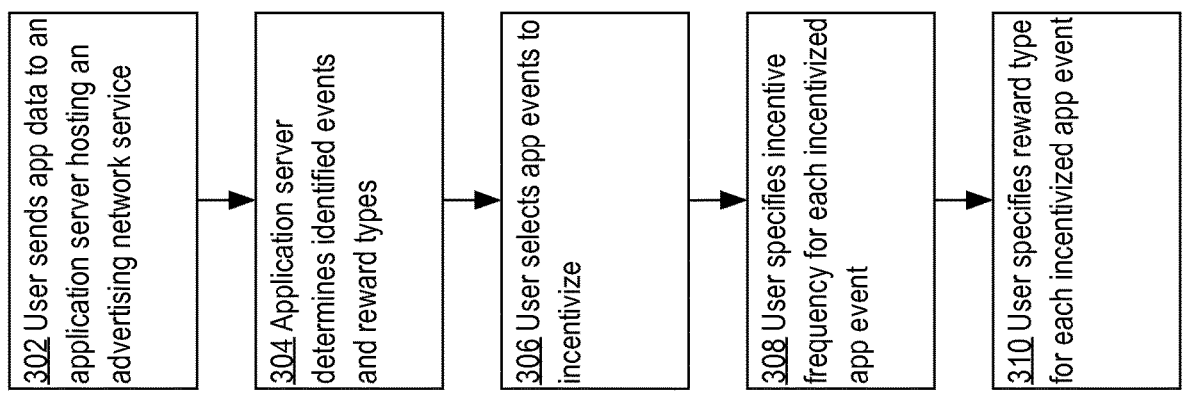
FIG. 3 illustrates a computer-implemented process for registering an app and configuring a registered app with an advertising network service.

FIG. 3 illustrates a process for registering an app and configuring a registered app with the advertising network service. In an embodiment, one or more of the steps described below may be omitted, repeated, or performed in a different order. The specific arrangement shown in FIG. 3 is not required.

In Step 302, an app publisher or other user sends app data to an application server hosting the advertising network service. The app data may represent an app that the app publisher desires to register with the service. In an embodiment, an app publisher may cause source code of an app, an app binary, or other information associated with an app to be uploaded to an application server such as application server 112. For example, an app publisher may cause the app data to be sent to application server 112 by uploading the app data using a web-based console or other interface provided by web server 208.

In Step 304, the application server determines for the app one or more configured app event types and reward types. In an embodiment, the application server may determine the configured app event types and reward types for the app by inspecting the provided app data. For example, in reference to the example app event type taxonomy described herein in Section 2.1, the application server may determine that an app has mapped app events to a "Life punishment" app event type, a "Game termination punishment" app event type, and one or more custom app event types. The application server may further determine that the app has mapped one or more app events to one or more reward types. The mapped reward types similarly may include reward types defined by an available reward type taxonomy and/or custom reward types. In an embodiment, data associated with the app, including the identified app event types and reward types, may be stored in a data repository such as data repository 114 for subsequent access and configuration.

In Step 306, a user selects one or more of the identified app event types to incentivize. In an embodiment, by selecting an identified app event type to incentivize, the user indicates a desire for installations of the app 202 on mobile devices 102, when executed, to generate scaffolding events in response to app 202 detecting occurrences of app events of the identified app event type. Conversely, by not selecting or unselecting one or more of the identified app event types, the user indicates a desire that scaffolding events not be generated in response to installations of app 202 detecting the one or more unselected app event types. In an embodiment, a user may select one or more app event types to incentivize from a list generated and displayed on the web-based console or other interface of application server 112. The list may be generated, for example, based on the identified app event types determined for the app in Step 302. Referring again to the example in Step 302, the user may be presented with a list that includes the "Life punishment" and "Game termination punishment" app event types, in addition to any custom event types identified by app 202. A user's selection of app event types to incentivize for a particular app may be stored by application server 112 in association with the registered app data stored in Step 302.

In an embodiment, a user may modify the selection of incentivized app event types for a particular app at any time after the app data is provided to application server 112. By enabling a user to select and modify incentivized app event types for a particular app using application server 112, the occurrence of scaffolding events in an app may be modified without the user modifying or redeploying the app to user devices.

In Step 308, a user specifies, for each incentivized app event type, an incentive frequency value. In an embodiment, an incentive frequency value specified for a particular app event type represents a frequency with which the user desires that a scaffolding event occur relative to the number of detected occurrences of an app event of the particular app event type. For example, a developer of an app may map one or more app events to a "Life punishment" app event type. The developer or other user associated with the app may further desire that a scaffolding event occur in the app in response to 10% of occurrences of an app event mapped to the "Life punishment" app event type. Accordingly, the developer may specify the desired incentive frequency value in association with the "Life punishment" app event type. In an embodiment, an incentive frequency value for a particular app event type may be specified as a percentage value or any other value indicating a desired ratio of scaffolding events per occurrences of an app event of the particular app event type.

In general, an incentive frequency value for a particular app event type may represent a desired frequency of scaffolding events per occurrences of the particular app event type for a particular app user. In an embodiment, the developer may further specify whether the incentive frequency value is configured for each separate user app session or maintained across a plurality of user app sessions.

In Step 310, a user selects a reward type for each incentivized app event type. The reward types available for selection for a particular app may, for example, be based on the reward types identified in Step 302. For example, if an app event type selected for incentivizing represents app events causing a decrease in an app user's available in-app currency, the app developer or publisher may select a reward type representing an app event causing an increase in the amount of in-game currency available to the app user. In this manner, the app developer or publisher may provide contextual rewards to an app user in response to the occurrence of particular app event types, and may modify the mapping between app event types and reward types over time.

2.3 Advertiser Registration

In an embodiment, application server 112 comprises advertisement registration unit 212 configured to enable advertisers to register ads with the advertising network service hosted by application server 112. In an embodiment, advertisers may use the web-based console provided by web server 208 or another interface to interact with advertisement registration unit 212.

In an embodiment, an advertiser may specify particular app event types that the advertiser desires to target with ads provided by the advertiser. For example, an advertiser desiring to place ads in a game app may indicate that ads associated with advertiser may be displayed in response to events representing currency punishment events, but not other events. By allowing an advertiser to select particular app event types, an advertiser may select app event types that may be most relevant to the ads provided by the advertiser. In an embodiment, advertisers may provide additional information in association with ads provided by the advertisers such as, for example, a message to display to the user when the ad is displayed.

In an embodiment, an advertiser may specify for each selected app event type whether rewards associated with scaffolding events generated for the app event type are associated with one or more specified actions. If a user indicates that a particular reward is associated with one or more specified actions, the reward may be provided to an app user in response to the app user completing the one or more specified actions either by engaging with the associated ad in some specified manner and/or taking specified actions external to the ad. If a scaffolding event is generated based on an app event type that is associated with one or more specified actions, an app user may be presented with the option to perform the actions and receive an associated reward, or to decline performing the actions and proceed in the app without receiving the reward. Examples of user actions that may be specified include instructing a user to watch an advertiser video, fill out an online survey, post a message to a social networking site, register a provided offer, subscribe to a commercial service, or view product information. In one embodiment, actions associated with a reward may involve user engagement or completing an action within ad itself, for example, by requesting that the user play a mini-game that runs within the ad. In other embodiments, actions associated with a reward may direct a user to download other apps and/or to engage with the downloaded apps in a particular fashion (e.g., reach a particular level in a downloaded game app).

In another embodiment, one or more app event types may not be associated with a specified action. If a scaffolding event is generated based on an app event type that is not associated with any specified actions, an associated reward may be provided to a user without any express action from the user. For example, if an advertiser does not specify an action in association with a particular app event type that a game publisher has associated with a reward type representing the addition of in-game currency, an app user may be provided an in-game currency reward in response to triggering an associated scaffolding event and without the user taking any express action with respect to an ad displayed in conjunction with the scaffolding event. An app user's interaction with rewards and specified actions associated with rewards is described in further detail with respect to FIG. 5 herein.

2.4 App Analytics

In an embodiment, application server 112 comprises app analytics unit 214. App analytics unit 214 may comprise logic configured to receive information related to the occurrence of app events within apps registered with application server 112. For example, SDK code 204 of an app 202 may be configured to report to app analytics unit 214 each time SDK code 204 is made aware of an occurrence of an app event and/or generates a scaffolding event.

In an embodiment, app analytics unit 214 may be configured to generate one or more analytic displays related to the occurrence of app events and other app related information. For example, app analytics unit 214 may generate one or more analytics displays for each registered app related to the number of occurrences of each identified app event type and reward type, including averages of the occurrence of particular app event types and reward types per user and per user session. Examples of other analytic displays for a particular app may relate to the total time users spend interacting with the app, the frequency with which users accept or decline rewards, and reward types most frequently accepted by users. In an embodiment, analytic displays generated by app analytics unit 214 may be access by game publishers and advertisers via a web-based console of web server 208.

In an embodiment, analytic displays generated by app analytics unit 214 may be referenced to inform decisions about incentivizing and placing ads with particular app event types registered in the service. For example, a game publisher may notice from app analytics unit 214 that a particular app event type representing a user failing a level is occurring frequently in an app registered by the game publisher. In response, the game publisher may decide to incentivize the particular app event type or to adjust the incentive frequency of the incentivized app event type using the web-based console of application server 112.

2.5 Example App Operation

As described above, an app 202 may be made available to users of mobile devices 102 via an app distribution server 106. Users of mobile devices 102 may install one or more of the available apps on their devices and may periodically execute and interact with installed apps. In one embodiment, the installed apps may be configured to detect the occurrence of app events and to generate scaffolding events according to settings configured by the app developer or publisher, as described above. FIG. 4A illustrates a computer-implemented process for detecting incentivized app events and generating scaffolding events according to an embodiment.

Referring to FIG. 4A, at Step 402A, a mobile device sends a request to an application server, the request comprising one or more data values identifying an app executing on the mobile device. The request may be generated, for example, in response to a user of the mobile device initiating execution of a particular app on a mobile device. For example, the user may select an icon or provide other input to the mobile device causing execution of the app. In an embodiment, the app may be configured to generate the request to the application server as part of initial execution steps of the app.

The request sent to the application server may comprise a unique app identifier or other information indicating that the app has initiated execution on the mobile device. The application server may use the app identifier to retrieve incentive data configured by a developer or publisher of the app, as described above in reference to FIG. 3. For example, the application server may retrieve incentive data for a particular app from a data repository such as data repository 114.

At Step 404A, the mobile device receives incentive data comprising one or more app event types, wherein each app event type is associated with an incentive frequency value and a reward type. In an embodiment, the incentive data comprises data identifying one or more app event types that a developer or publisher of the app has identified as incentivized app event types with the advertising network service. Similarly, the associated incentive frequency values and reward types may represent the values configured by the developer or publisher for each of the app event types. The mobile device may store the received incentive data for subsequent access during execution of the app.

At Step 406A, the app detects an occurrence of an incentivized app event type. In an embodiment, the app may detect occurrences of any app event mapped to an app event type by the developer of the app. For example, logic of SDK code 204 may be triggered by app event logic 206 each time one of the app events mapped by the developer of app 202 occurs during execution of app 202. The logic of SDK code 204 or other logic of app 202 may then determine whether the app event type associated with the detected app event is one of the app event types identified in the received incentive data. If the app event type is one of those identified in the received incentive data, the app may determine that the app event type represents an incentivized app event type.

In an embodiment, in response to the app detecting an occurrence of an app event, the app may send to application server 112 data comprising identifiers of the mobile app, a user of the mobile app, and the app event type associated with the app event. The app may send the data in response to detecting both incentivized and non-incentivized app events. For example, the logic of SDK code 204 may generate and send the message in response to being notified of the occurrence of an app event by app event logic 206. Application server 112 may collect the data sent from the app, and from other apps and other devices, in order to generate one or more statistical displays, as described above in Section 2.4.

At Step 408A, a determination is made, based on the incentive frequency value associated with the incentivized app event type, whether to generate a scaffolding event. In one embodiment, the app may determine whether to generate a scaffolding event by comparing the incentive frequency value, representing a desired frequency of occurrences, to an actual historical frequency of occurrences of scaffolding events. For example, the app may track, for each app event type, a total number of past occurrences of app events of the app event type. The app may also track the number of past occurrences of a scaffolding event for each app event type. The app may compute a historical scaffolding event frequency value for a particular app event type based on a ratio of the total number of past occurrences of an app event of the particular app event type and the total number of past occurrences of a scaffolding event for the app event type. In an embodiment, the app may determine whether to generate a scaffolding event by determining whether the incentive frequency value exceeds the historical scaffolding event value. For example, if a developer or publisher has specified an incentive frequency of 10%, and the app computes a historical scaffolding event frequency value of 9%, the app may determine that a scaffolding event is to be displayed. In an embodiment, an exception may be made if no previous scaffolding events have been generated for a particular app event type. In the event of there being no historical scaffolding event frequency information, the occurrence of a scaffolding event may, for example, be based on a randomized chance equal to the incentive frequency value.

In one embodiment, the determination of whether to generate a scaffolding event may comprise determining whether generation of a scaffolding event would occur within a specified time period of the most recent scaffolding event. If the most recent scaffolding event occurred within the specified time period, a new scaffolding event may not be triggered, even if the occurrence of the scaffolding event would not cause the scaffolding event frequency exceed the specified incentive frequency. By specifying a minimum time period between the generation of scaffolding events, app users may be prevented from causing a large number of app events to occur in a short period of time in order to generate more scaffolding events, thereby effectively "gaming" the system. In an embodiment, the minimum time period may be specified by an app developer as part of app event logic 206, or specified by a publisher using the web-console of application server 112.

If in Step 408A it is determined that generating a scaffolding event would cause the occurrence of scaffolding events to exceed the specified incentive frequency, the process returns to Step 406A and awaits the occurrence of subsequent incentivized app events.

If in Step 408A it is determined that generating a scaffolding event would not exceed the incentive frequency, a scaffolding event is generated in Step 410A. In general, generating a scaffolding event comprises displaying an advertisement and determining whether to provide a reward, as further described below in reference to FIG. 5.

Figure 4B:
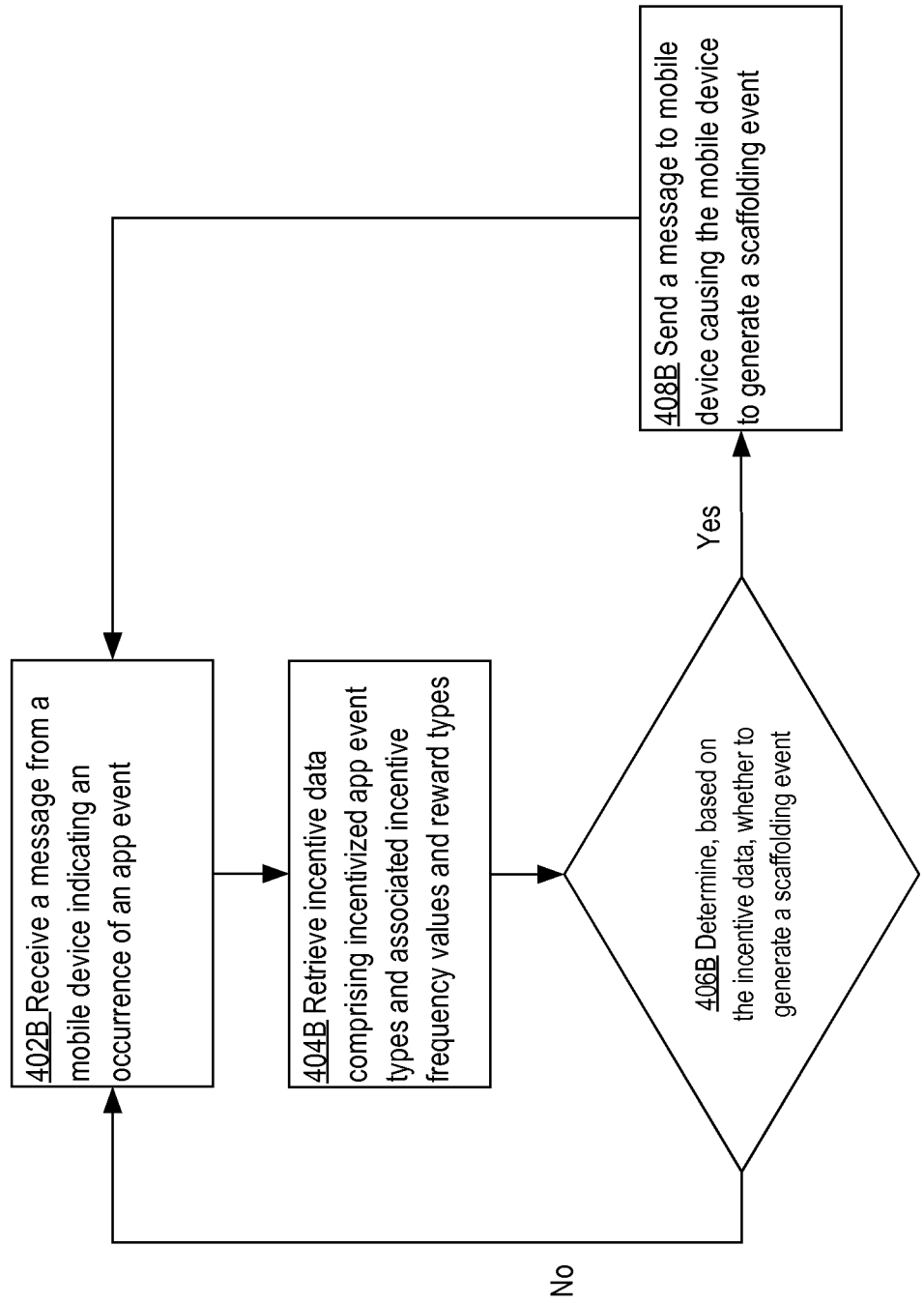
FIG. 4B illustrates a computer-implemented process for determining whether to generate a scaffolding event, according to another embodiment.

In the example process illustrated above and in FIG. 4A, an app installed on a mobile device may be configured to detect the occurrence of app events and to determine, by the mobile device, whether to generate a scaffolding event. FIG. 4B illustrates a computer-implemented process for determining whether to generate a scaffolding event, according to another embodiment. In general, FIG. 4B illustrates an example process for determining, by a centralized application server such as an application server 112, whether to generate a scaffolding event for a particular instance of an app running on a mobile device. The process for determining whether to generate scaffolding events for a particular app may be processed by a centralized application server rather than by the app, for example, in order to reduce the processing demands of a mobile device executing the app.

In Step 402B, an application server receives a message from a mobile device indicating an occurrence of an app event. As described above in reference to FIG. 4A, apps may be configured to send data comprising various identifying information in response to detecting an occurrence of an app event. For example, a particular app detecting an occurrence of an app event may send a message to the application server that includes identifiers of the particular mobile app generating the message, a user of the mobile app, and an app event type associated with the app event. In an embodiment, the application server may store the received data included in an app event message for generating various analytics and configuration displays.

In Step 404B, the application server retrieves incentive data comprising incentivized app event types and associated incentive frequency values and reward types. The application server may retrieve the incentive data for a particular app, for example, from a data repository based on one or more of the identifiers included in the app event message. The incentive data may comprise information indicating whether one or more app event types associates with the app generating the message are incentivized app event types and, for each incentivized app type, an associated incentive frequency value and a reward type.

In Step 406B, the application server determines, based on the incentive data, whether to generate a scaffolding event. In one embodiment, the determination comprises determining whether incentive data identifies the app event type associated with the app event generating the message as an incentivized app event type. If the app event type is not identified as an incentivized app event type, the application server may take no further action and return to Step 402B to await receipt of additional messages. If the app event type is identified in the incentive data as an incentivized app event type, then determining whether to generate a scaffolding event may further comprise determining whether to generate a scaffolding event based on an associated incentive frequency value of the retrieved incentive data. In an embodiment, the incentive frequency value for the app event type may be compared to an actual historical frequency of occurrences of scaffolding events for the app event type, which may be tracked by the application server or included in the message from the mobile device reporting the occurrence of the app event.

In Step 408B, in response to determining to generate a scaffolding event, the application server sends a message to the mobile device causing the mobile device to generate a scaffolding event. In an embodiment, the message sent to a mobile device causing the mobile device to generate a scaffolding event may include an advertising unit and reward type information, as described below.

Figure 5:
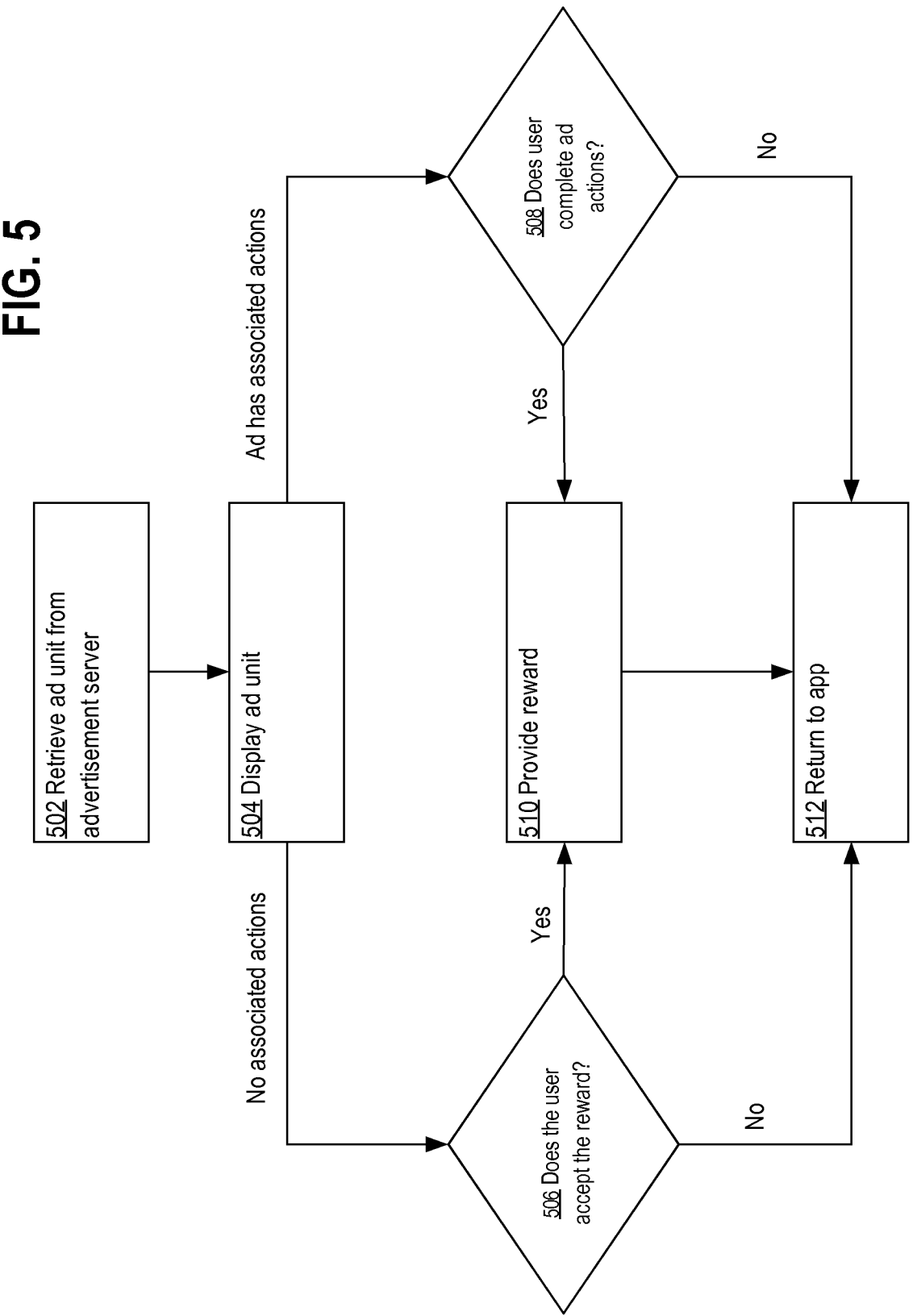
FIG. 5 illustrates a computer-implemented process for generating a scaffolding event by a mobile device.

FIG. 5 illustrates a computer-implemented process for generating a scaffolding event by a mobile device. In general, a mobile device may generate a scaffolding event either in response the mobile device determining to generate the scaffolding event, or in response to an application server causing the mobile device to generate the scaffolding event, as described above in reference to FIGS. 4A, 4B. In an embodiment, one or more of the steps described below may be omitted, repeated, or performed in a different order. The specific arrangement shown in FIG. 5 is not required.

At Step 502, an advertisement unit is retrieved from an advertisement server. In general, an advertisement server stores an inventory of ads that are available for use in the advertising network service. For example, the inventory of ads may comprise ads provided by advertisers using advertisement registration unit 212. In one embodiment, a request to the advertisement server may comprise information identifying the particular app, the app event type generating the request, and other information including user and mobile device identification information. The request may be generated by either a mobile device or an application server, depending on which device made the determination to generate a scaffolding event for the app. If the request is generated by an application server, the generated advertising unit may be sent to the associated mobile device directly, or to the application server for delivery to the mobile device. In an embodiment, an application server 112 may comprise the advertisement server or the advertisement server may be a separate server.

In response to receiving the request, an advertisement server may select an appropriate advertising unit based on one or more settings configured by advertisers, as described in Section 2.3. For example, the advertisement server may retrieve an advertising unit that is associated with the particular app event type and that currently is associated with the highest advertiser bid value for the particular app event type.

At Step 504, the retrieved ad unit is displayed. In an embodiment, displaying an ad unit may comprise displaying a message to the user indicating that the advertiser associated with the ad unit is offering a particular reward to the user. For example, the app may display a default message, or may display a custom advertiser message included in the ad unit.

In an embodiment, the process of FIG. 5 proceeds to either Step 506 or Step 508 depending on whether the reward is associated with any specified actions. The ad unit may comprise a value or other data indicating whether or not the reward is associated with a specified action. If the app determines that the award is not associated with an action, in Step 506, the app determines whether the user accepts the award.

In Step 510, if the user accepts the reward, the reward is provided to the user. The user may accept the reward, for example, by clicking on a graphical button or providing other input indicating that the user desires to accept the reward. In an embodiment, the app may provide the reward by determining an app event of the reward type associated with the app event type generating the scaffolding event. As described above, the mapping between app event types and reward types may be specified in the incentive data received by the app from an application server. The app event corresponding to the reward type generally may provide the user with an in-game benefit such as increasing the user's available amount of in-game currency, providing the user with in-game items or content, updating gameplay data to indicate successful completion of a particular game level or otherwise changing the game level of the user, or any other action programmed by the developer of the app.

In response to the award being provided, the app may continue execution in Step 512. In an embodiment, if the user provides input indicating that the user is choosing not to accept the reward in Step 506, the app may continue execution in Step 512 without providing the reward to the user.

If the reward is associated with one or more specified actions, in Step 508, the app determines whether the user completes the one or more actions. In an embodiment, an advertising unit associated with reward may include instructions related to the one or more specified actions and the user may receive the reward in response to the user completing the specified actions. As described above, the actions may include watching an advertiser video, filling out an online survey, posting a message to a social networking site, and other actions that may related directly to the ad or to content external to the ad. If the app determines that the user completes the specified actions in Step 508, the user may be provided with the reward in Step 510. If the user does complete the specified actions, for example, by exiting the ad display without engaging with the ad or providing other input indicating that the user does not desire to accept the reward, the app may continue execution in Step 512 without providing the reward to the user.

3.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
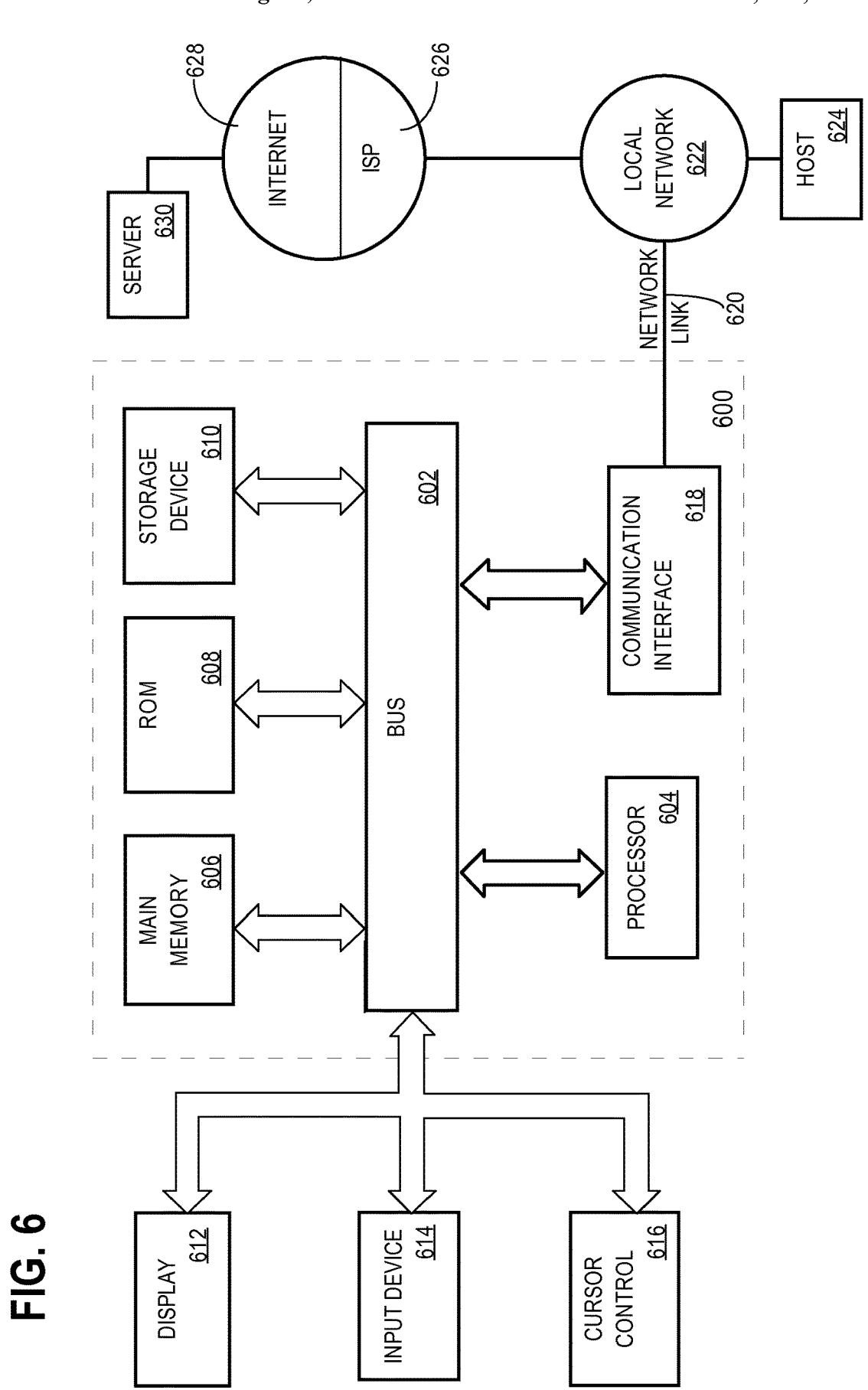
FIG. 6 illustrates a computer system that may be used to implement aspects of an embodiment.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

4.0 Extensions & Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
using a programmed digital electronic mobile computing device requesting, by a mobile app executing on the mobile device, incentive data from an app server and receiving the incentive data;
wherein the incentive data comprises first incentive data associating a first app event type with a first incentive frequency value and a first reward type and second incentive data associating a second app event type with a second incentive frequency value and a second reward type, wherein the first app event type is different from the second app event type, and wherein the first reward type is different from the second reward type;
wherein the first incentive frequency value and the second incentive frequency value each indicates a ratio of scaffolding events to a number of occurrences of app events of the associated app event type;
wherein rewards of the first reward type and rewards of the second reward type are related to app events of the associated app event type;
detecting, by an app event logic of the mobile device, an occurrence of a particular app event of the mobile app, wherein the particular app event is associated with the first event type;
determining, by the mobile device based on the incentive data, that the particular app event is an incentivized app event;
determining, by the mobile device based on the first incentive frequency value, whether to generate a scaffolding event, wherein the scaffolding event comprises displaying an advertisement using a display of the mobile device and providing a reward of the first reward type, and wherein the scaffolding event is an event that occurs within the mobile app during execution using the mobile device;
in response to determining that the scaffolding event should be generated, using the mobile device displaying, on the mobile device, the advertisement and providing the reward.

2. The method of claim 1, wherein determining whether to generate the scaffolding event further comprises determining (a) a number of occurrences of app events of the particular app event type, and (b) a number of scaffolding events generated in response to an occurrence of an app event of the particular app event type.

3. The method of claim 2, further comprising:
determining a historical scaffolding event frequency value based on a ratio of (a) the number of occurrences of app events of the particular app event type and (b) the number of scaffolding events generated in response to an occurrence of an app event of the particular app event type;
wherein determining whether to generate a scaffolding event further comprises determining that the incentive frequency value exceeds the historical scaffolding event frequency value.

4. The method of claim 2, wherein the number of occurrences of app events of the particular app event type is based on one of: a current session of the mobile app, a plurality of sessions of the mobile app.

5. The method of claim 1, wherein the mobile app is a game app, and wherein each of the plurality of app event types represents a gameplay related event.

6. The method of claim 5, wherein one or more of the one or more app event types comprises one of a game currency punishment event, a game life punishment event, a game termination event, a game level setback event, a custom game event.

7. The method of claim 5, wherein the reward is associated with the game app and comprises one or more of: an increase of in-game currency or in-game energy, an increase of available in-game lives, advancing a user of the mobile app to a particular in-game level, granting the user an in-game item, or a custom reward.

8. The method of claim 1, further comprising:
in response to determining to generate a scaffolding event, sending a request to an advertisement server for an advertising unit comprising a particular ad;
determining whether a user of the mobile app interacts with the particular ad;
in response to determining that the user interacts with the particular ad, providing the reward.

9. The method of claim 1, further comprising sending, to a server, a message comprising identifiers of one or more of the mobile app, a user of the mobile app, or the particular app event type.

10. A data processing method comprising:
using a programmed digital electronic mobile computing device requesting, by a game app executing on the mobile device, incentive data from an app server and receiving the incentive data;
wherein the incentive data comprises first incentive data associating a first adverse gameplay event type with a first incentive frequency value and a first game reward type and second incentive data associating a second adverse gameplay event type with a second incentive frequency value and a second game reward type, wherein the first adverse gameplay event type is different from the second adverse gameplay event type, and wherein the first game reward type is different from the second game reward type;
wherein the first incentive frequency value and the second incentive frequency value each indicates a ratio of scaffolding events to a number of occurrences of adverse gameplay events of the associated adverse gameplay event type;
wherein rewards of the first game reward type and rewards of the second reward type are related to adverse gameplay events of the associated gameplay event type;
using app event logic of the mobile device, detecting an occurrence of a particular gameplay event of the game app, wherein the particular gameplay event is associated with the first adverse gameplay event type;
determining, by the mobile device based on the incentive data, that the particular adverse gameplay event is an incentivized adverse gameplay event;
determining, by the mobile device based on the first incentive frequency value, whether to generate a scaffolding event, wherein the scaffolding event comprises displaying an advertisement using a display of the mobile device and providing a game reward of the first game reward type, and wherein the scaffolding event is an event that occurs within the game app during execution using the mobile device;

in response to determining that the scaffolding event should be generated, using the mobile device displaying, on the mobile device, the advertisement and providing the game reward.

11. The method of claim 10, wherein one or more of the one or more adverse gameplay event types comprises one of a game currency punishment event, a game life punishment event, a game termination event, a game level setback event, a custom game event.

12. The method of claim 10, wherein the game reward comprises one or more of: an increase of in-game currency or in-game energy, an increase of available in-game lives, advancing a user of the game app to a particular in-game level, granting the user an in-game item, or a custom game reward.

13. The method of claim 10, further comprising:
in response to determining to generate a scaffolding event, sending a request to an advertisement server for an advertising unit comprising a particular ad;
determining whether a user of the mobile app interacts with the particular ad;
in response to determining that the user interacts with the particular ad, providing the game reward.

14. A data processing method comprising:
using an app server receiving, from the mobile device, a message indicating an occurrence of a gameplay event of a game app executing on the mobile device, wherein the gameplay event is associated with a particular adverse gameplay event type of one or more adverse gameplay event types;
retrieving, by an app event logic of the app server, incentive data associated with the one or more adverse gameplay event types, wherein the incentive data indicates, for each of the one or more adverse gameplay event types, an incentive frequency value and a game reward type, wherein game rewards of the game reward type are related to adverse gameplay events of the adverse gameplay event type, wherein the incentive frequency value indicates a ratio of scaffolding events to a number of occurrences of adverse gameplay events of the associated adverse gameplay event type;
determining, by the app server based on the incentive data, that the particular adverse gameplay event is an incentivized adverse gameplay event;
determining, by the app server, based on the incentive frequency value associated with the particular adverse gameplay event type, whether to cause the mobile device to generate a scaffolding event, wherein the scaffolding event comprises displaying an advertisement and providing a game reward of the game reward type associated with the particular adverse gameplay event and wherein the scaffolding event is an event that occurs within the game app during execution using the mobile device;
in response to determining that the scaffolding event should be generated, using the app server, causing the mobile device to display the advertisement and to provide the game reward.

15. A non-transitory computer-readable medium storing one or more sequences of instructions, which when executed by one or more processors, cause the one or more processors to carry out the steps of:
using a programmed digital electronic mobile computing device requesting, by a mobile app executing on the mobile device, incentive data from an app server and receiving the incentive data;
wherein the incentive data comprises first incentive data associating a first app event type with a first incentive frequency value and a first reward type and second incentive data associating a second app event type with a second incentive frequency value and a second reward type, wherein the first app event type is different from the second app event type, and wherein the first reward type is different from the second reward type;
wherein the first incentive frequency value and the second incentive frequency value each indicates a ratio of scaffolding events to a number of occurrences of app events of the associated app event type;
wherein rewards of the first reward type and rewards of the second reward type are related to app events of the associated app event type;
detecting, by an app event logic of the mobile device, an occurrence of a particular app event of the mobile app, wherein the particular app event is associated with the first event type;
determining, by the mobile device based on the incentive data, that the particular app event is an incentivized app event;
determining, by the mobile device based on the first incentive frequency value, whether to generate a scaffolding event, wherein the scaffolding event comprises displaying an advertisement using a display of the mobile device and providing a reward of the first reward type, and wherein the scaffolding event is an event that occurs within the mobile app during execution using the mobile device;
in response to determining that the scaffolding event should be generated, using the mobile device displaying, on the mobile device, the advertisement and providing the reward.

16. The non-transitory computer-readable medium of claim 15, wherein determining whether to generate the scaffolding event further comprises determining (a) a number of occurrences of app events of the particular app event type, and (b) a number of scaffolding events generated in response to an occurrence of an app event of the particular app event type.

17. The non-transitory computer-readable medium of claim 16, wherein the one or more instructions further comprise instructions which, when executed by one or more processors, cause the one or more processors to perform:
determining a historical scaffolding event frequency value based on a ratio of (a) the number of occurrences of app events of the particular app event type and (b) the number of scaffolding events generated in response to an occurrence of an app event of the particular app event type;
wherein determining whether to generate a scaffolding event further comprises determining that the incentive frequency value exceeds the historical scaffolding event frequency value.

18. The non-transitory computer-readable medium of claim 16, wherein the number of occurrences of app events of the particular app event type is based on one of: a current session of the mobile app, a plurality of sessions of the mobile app.

19. The non-transitory computer-readable medium of claim 15, wherein the mobile app is a game app, and wherein each of the plurality of app event types represents a gameplay related event.

20. The non-transitory computer-readable medium of claim 19, wherein one or more of the one or more app event types comprises one of a game currency punishment event, a game life punishment event, a game termination event, a game level setback event, a custom game event.

21. The non-transitory computer-readable medium of claim 19, wherein the reward is associated with the game app and comprises one or more of: an increase of in-game currency or in-game energy, an increase of available in-game lives, advancing a user of the mobile app to a particular in-game level, granting the user an in-game item, or a custom reward.

22. The non-transitory computer-readable medium of claim 15, wherein the one or more instructions further comprise instructions which, when executed by one or more processors, cause the one or more processors to perform:
in response to determining to generate a scaffolding event, sending a request to an advertisement server for an advertising unit comprising a particular ad;
determining whether a user of the mobile app interacts with the particular ad;
in response to determining that the user interacts with the particular ad, providing the reward.

23. The non-transitory computer-readable medium of claim 15, wherein the one or more instructions further comprise instructions which, when executed by one or more processors, cause the one or more processors to perform sending, to a server, a message comprising identifiers of one or more of the mobile app, a user of the mobile app, or the particular app event type.

24. A non-transitory computer-readable medium storing one or more sequences of instructions, which when executed by one or more processors, cause the one or more processors to carry out the steps of:
using a programmed digital electronic mobile computing device requesting, by a game app executing on the mobile device, incentive data from an app server and receiving the incentive data;
wherein the incentive data comprises first incentive data associating a first adverse gameplay event type with a first incentive frequency value and a first game reward type and second incentive data associating a second adverse gameplay event type with a second incentive frequency value and a second game reward type, wherein the first adverse gameplay event type is different from the second adverse gameplay event type, and wherein the first game reward type is different from the second game reward type;
wherein the first incentive frequency value and the second incentive frequency value each indicates a ratio of scaffolding events to a number of occurrences of adverse gameplay events of the associated adverse gameplay event type;
wherein rewards of the first game reward type and rewards of the second reward type are related to adverse gameplay events of the associated gameplay event type;
detecting, by an app event logic of the mobile device, an occurrence of a particular gameplay event of the game app, wherein the particular gameplay event is associated with the first adverse gameplay event type;
determining, by the mobile device based on the incentive data, that the particular adverse gameplay event is an incentivized adverse gameplay event;
determining, by the mobile device based on the first incentive frequency value value, whether to generate a scaffolding event, wherein the scaffolding event comprises displaying an advertisement using a display of the mobile device and providing a game reward of the first game reward type, and wherein the scaffolding event is an event that occurs within the game app during execution using the mobile device;
in response to determining that the scaffolding event should be generated, using the mobile device displaying, on the mobile device, the advertisement and providing the game reward.

25. The non-transitory computer-readable medium of claim 24, wherein one or more of the one or more adverse gameplay event types comprises one of a game currency punishment event, a game life punishment event, a game termination event, a game level setback event, a custom game event.

26. The non-transitory computer-readable medium of claim 24, wherein the game reward comprises one or more of: an increase of in-game currency or in-game energy, an increase of available in-game lives, advancing a user of the game app to a particular in-game level, granting the user an in-game item, or a custom game reward.

27. The non-transitory computer-readable medium of claim 24, wherein the one or more instructions further comprise instructions which, when executed by one or more processors, cause the one or more processors to perform:
in response to determining to generate a scaffolding event, sending a request to an advertisement server for an advertising unit comprising a particular ad;
determining whether a user of the mobile app interacts with the particular ad;
in response to determining that the user interacts with the particular ad, providing the game reward.

28. A non-transitory computer-readable medium storing one or more sequences of instructions, which when executed by one or more processors, cause the one or more processors to carry out the steps of:
using an app server receiving, from the mobile device, a message indicating an occurrence of a gameplay event of a game app executing on the mobile device, wherein the gameplay event is associated with a particular adverse gameplay event type of one or more adverse gameplay event types;
retrieving, by an app event logic of the app server, incentive data associated with the one or more adverse gameplay event types, wherein the incentive data indicates, for each of the one or more adverse gameplay event types, an incentive frequency value and a game reward type, wherein game rewards of the game reward type are related to adverse gameplay events of the adverse gameplay event type, wherein the incentive frequency value indicates a ratio of scaffolding events to a number of occurrences of adverse gameplay events of the associated adverse gameplay event type;
determining, by the app server based on the incentive data, that the particular adverse gameplay event is an incentivized adverse gameplay event;
determining, by the app server, based on the incentive frequency value associated with the particular adverse gameplay event type, whether to cause the mobile device to generate a scaffolding event, wherein the scaffolding event comprises displaying an advertisement and providing a game reward of the game reward type associated with the particular adverse gameplay event and wherein the scaffolding event is an event that occurs within the game app during execution using the mobile device;

in response to determining that the scaffolding event should be generated, using the app server, causing the mobile device to display the advertisement and to provide the game reward.

* * * * *